United States Patent [19]

Parker

[11] Patent Number: 5,006,872
[45] Date of Patent: Apr. 9, 1991

[54] VIDEO ATTACHMENT SYSTEM FOR MICROSCOPES

[75] Inventor: Walter D. Parker, Saugus, Calif.

[73] Assignee: Mideo Systems, Inc., Huntington Beach, Calif.

[21] Appl. No.: 446,633

[22] Filed: Dec. 6, 1989

[51] Int. Cl.⁵ .............................................. G03B 17/48
[52] U.S. Cl. ..................................... 354/79; 350/502; 358/93
[58] Field of Search ........................ 354/79; 350/502; 358/93, 97

[56] References Cited

U.S. PATENT DOCUMENTS

| | | | |
|---|---|---|---|
| 2,290,874 | 7/1942 | Graff | 350/502 |
| 2,842,026 | 7/1958 | Reese et al. | 354/79 |
| 3,545,355 | 12/1970 | Cahall | 354/79 |
| 4,594,608 | 6/1986 | Hatae et al. | 358/93 |

Primary Examiner—A. A. Mathews
Attorney, Agent, or Firm—Roberts and Quiogue

[57] ABSTRACT

A video camera support system for a video microscopy system including an adjustable boom for supporting a video camera at selected locations, and a microscope/camera coupler attached to a microscope for slidably engaging the lens mount of the video camera. The video camera is supported by the boom as aligned with the microscope/camera coupler.

1 Claim, 2 Drawing Sheets

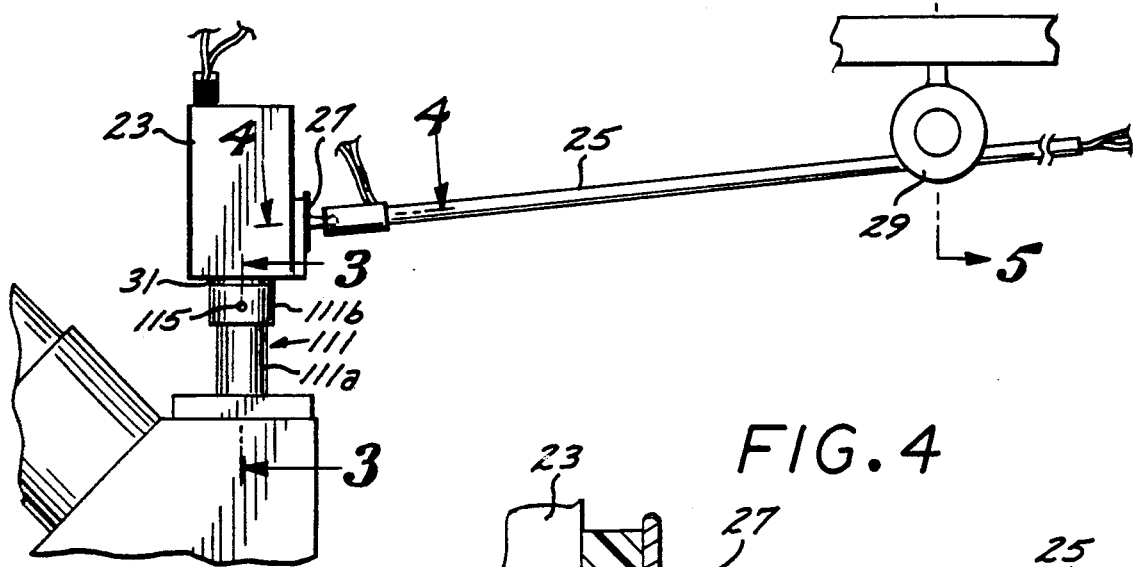
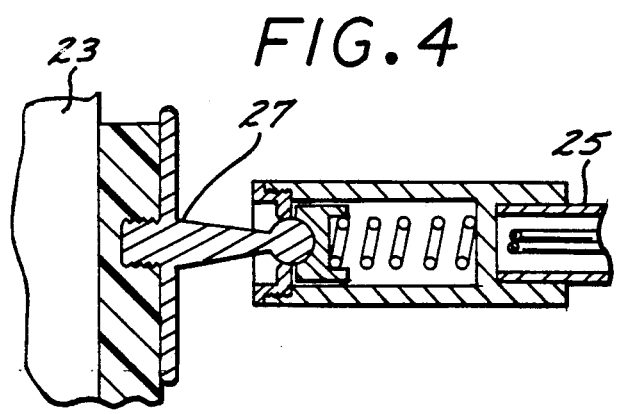
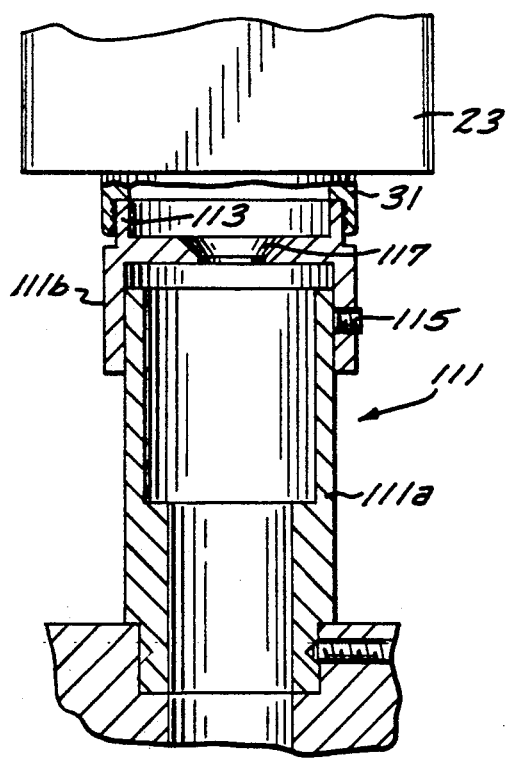
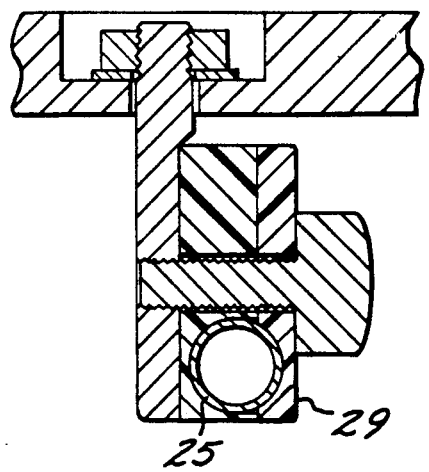

VIDEO ATTACHMENT SYSTEM FOR MICROSCOPES

BACKGROUND OF THE INVENTION

The disclosed invention is directed generally to video microscopy systems, and more particularly to a quick-release video camera support system for a video microscopy system that can have a plurality of microscope and/or direct view work areas.

A video microscopy system basically includes a microscope, a video camera coupled to the microscope, and a video monitor, and is generally utilized for presentation of microscope images to a group of observers. Video microscopy systems offer the advantages of lower cost in comparison to having a number of microscopes, the affordability of better grade microscopes since fewer are needed, the capability of using a pointer, and more effective communication since all observers are observing the same image.

Typically, the video camera in a video microscopy system is secured to the microscope via a threaded fitting that engages the internally threaded lens mount of the video camera. While such mechanism for supporting a video camera might be acceptable where only one microscope is utilized, it is cumbersome in a video microscopy system having one camera and more than one microscope. Generally, the use of a threaded connection for supporting a video camera on a microscope makes moving the video camera, for example, to view something other than the microscope image, cumbersome, time consuming, and possibly disruptive of a presentation.

SUMMARY OF THE INVENTION

It would therefore be an advantage to provide a video camera support system for a video microscopy system that allows for efficient transfer of a video camera from one microscope to another microscope or to a direct view work area.

The foregoing and other advantages are provided by the invention in a support system that includes an adjustable support boom for supporting a video camera at selected locations in selected positions within a predetermined three-dimensional space, and a generally tubular coupler fixedly attached to microscope for slidably engaging the lens mount of the video camera and being quickly releasable therefrom. The coupler functions to align the video camera which is substantially supported by the adjustable boom. The use of a quick release, slidable coupler allows for fast and efficient transfer of the video camera from one microscope to another, or from a microscope to a direct view work area having, for example, a dissecting pan. For direct view usage, an appropriate lens would be connected to the video camera.

BRIEF DESCRIPTION OF THE DRAWING

The advantages and features of the disclosed invention will readily be appreciated by persons skilled in the art from the following detailed description when read in conjunction with the drawing wherein:

FIG. 2 shows the components of a video camera support system in accordance with the invention.

FIG. 3 is a detail view of the video/microscope coupler of the video camera support system of FIG. 2.

FIG. 4 is a detail view of a frictional pivot structure by which a video camera is secured to the camera support the video camera support system of FIG. 2.

FIG. 5 is a detail view of a boom support of the video camera support system of FIG. 2.

DETAILED DESCRIPTION OF THE DISCLOSURE

Figure 1:
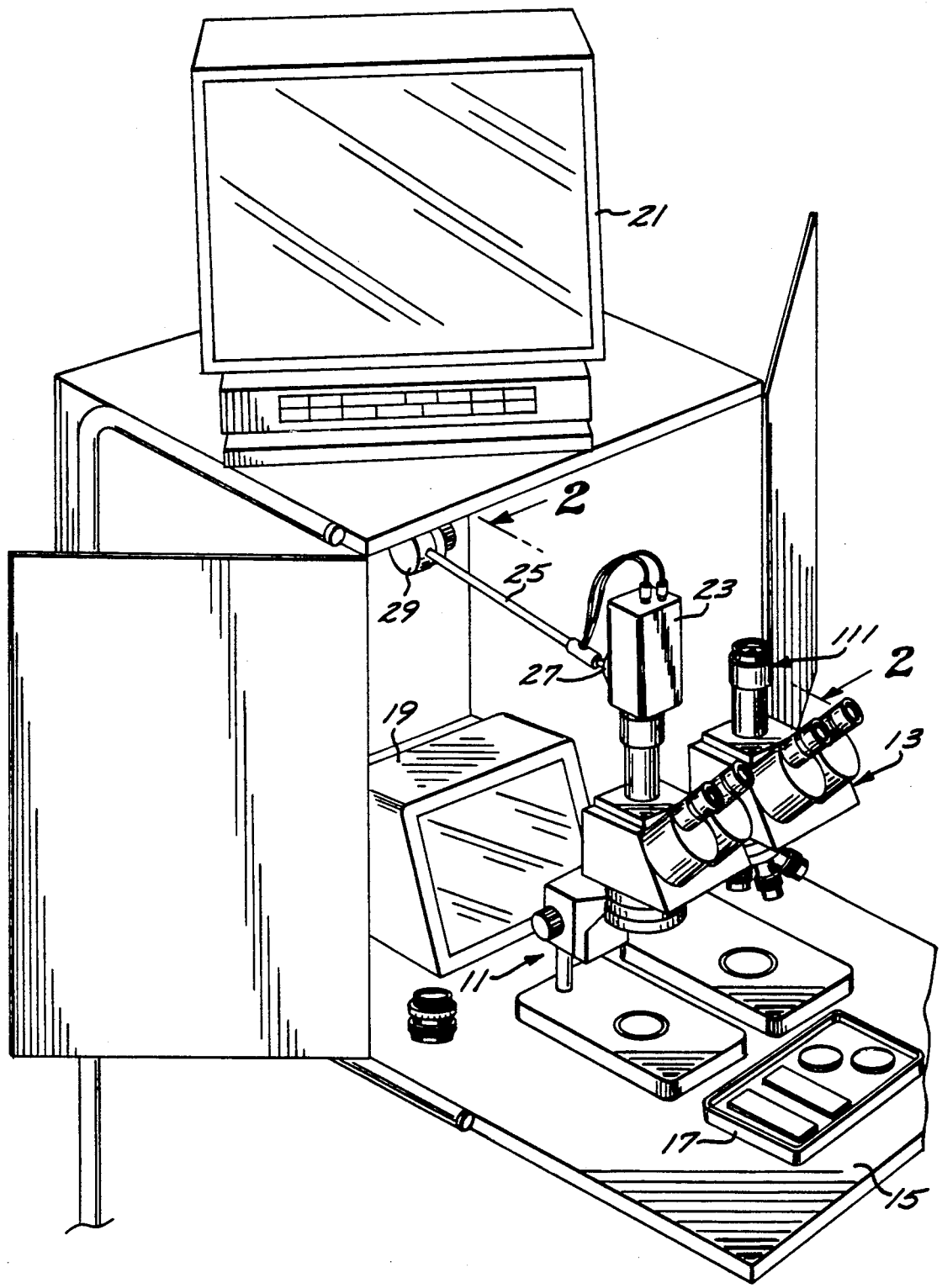
FIG. 1 is a perspective view of a video microscopy system with which the invention is utilized.

In the following detailed description and in the several figures of the drawing, like elements are identified with like reference numerals.

Referring now to FIG. 1, shown therein is a video microscopy system which includes a video camera support system in accordance with the invention. The video microscopy system includes a multi-level stand 20 for supporting first and second microscopes 11, 13 (shown by way of illustrative example as a stereo microscope and a compound microscope) on a lower level that includes a work area 15. By way of illustrative example, the work area 15 can be utilized to support a dissecting pan 17, for example, or other structure as appropriate to the use of the video microscopy system. Also on the lower level is a small video monitor 19 to permit the operator to monitor the video being displayed on a larger video monitor 21 which is on the upper level of the stand 20.

A video camera 23 is secured to one end of an adjustable boom 25 by a frictional pivot structure 27 that allows the relative position of the camera to the boom to be fixed by the operator. The boom 25 is supported by a boom bracket 29 which is secured to the lower side of the upper level of the stand 11. As shown in FIG. 5, the boom bracket 29 is selectively lockable, for example, with appropriate manually controlled frictional elements, to permit the selective location of the video camera 23 in a three-dimensional space that includes the microscopes 11, 13 and the region above the work area 15.

Referring to FIG. 3, the video camera 23 includes an internally threaded lens mount 31, such as the generally standard "C" mount utilized with commercially available video cameras. FIG. 3 further shows a detail view of a microscope/camera coupler 111 in accordance with the invention. The coupler 111 comprises a generally cylindrical lower tube 111a and an upper sleeve 111b which is slidably engaged over the lower tube so that the coupler is longitudinally extendable. The lower tube is configured to be secured in the camera port of an appropriate microscope, while the upper sleeve is configured to be slidably engaged in the lens opening of the video camera. In particular, the upper sleeve 111b includes a barrel portion that is configured to frictionally fit over a selected portion of the lower tube 111a, and further includes a terminal ring 113 formed on the camera end of the sleeve and having an outside diameter that permits the terminal ring to be slidably inserted into the opening of the video camera lens mount 31. Setscrews 115 maintain the selected longitudinal length of the microscope/camera coupler 111, which is set as described further herein. It should be noted that the lower tube is essentially a shorter version of commercially available microscope camera tubes.

The upper sleeve 111b includes a fixed diaphragm 117 which is configured to so that the imaging illumination that reaches the plane of the integrated circuit imaging chip in the video camera 23 is confined to an area on such plane that is only slightly greater than the area of the imaging chip. In this manner, a "hot spot" in the center of the video image is prevented.

The thickness of the terminal ring in the longitudinal direction is configured to provide for a slightly snug fit with the video camera lens mount. The microscope/camera coupler 111 functions primarily to align and optically couple the video camera with the microscope, with the support of the video camera being provided by the boom 25.

The microscope/camera coupler 111 comprises two pieces to permit adjustment of the longitudinal length thereof to locate the plane of the imaging chip of the video camera 23 at a precise location that provides for parfocality, which is the ability to change magnification without refocusing. It is noted that for different examples of the same model microscope, parfocality will be at different optical planes, which makes important the ability to change the longitudinal length of the microscope/camera coupler 111. Once parfocality is achieved, the setscrews 115 are tighted to maintain the particular setting.

The foregoing has been a disclosure of a video camera support system for a video microscopy system that allows for efficient transfer of a video camera from one viewing location (for example, a microscope or a work area) to another viewing location without time-consuming camera uncoupling and coupling procedures. That is, different modalities are efficiently achieved with reduced changeover procedures.

Although the foregoing has been a description and illustration of specific embodiments of the invention, various modifications and changes thereto can be made by persons skilled in the art without departing from the scope and spirit of the invention as defined by the following claims.

What is claimed is:

1. A support system for supporting a video camera relative to a microscope camera port, the video camera having a lens mount opening, the support system comprising:
   means for supporting the video camera at selected locations in selected positions within a three-dimensional space;
   a tube securable in the microscope camera port;
   a sleeve having one end engaged with said tube to form a generally cylindrical structure and adapted to provide for adjustment of the longitudinal dimension of said generally cylindrical structure, and having the other end adapted to slidably engage the lens mount opening of the video camera in alignment with the microscope camera port, whereby the video camera is substantially supported in position by said support means; and
   a diaphragm formed in said sleeve.

* * * * *